United States Patent [19]
Conrad

[11] Patent Number: 5,683,017
[45] Date of Patent: Nov. 4, 1997

[54] ELECTROMAGNETIC METER

[76] Inventor: Larry M. Conrad, R.R. 1 - Box 103, Delta, Iowa 52550

[21] Appl. No.: 712,598

[22] Filed: Sep. 13, 1996

[51] Int. Cl.⁶ .................................................. B67D 3/00
[52] U.S. Cl. ........................... 222/504; 251/65; 251/129.2
[58] Field of Search ..................... 222/504; 251/65, 251/129.2, 299

[56] References Cited

U.S. PATENT DOCUMENTS

| | | | |
|---|---|---|---|
| 3,120,943 | 2/1964 | Donelan | 251/129.21 |
| 3,245,652 | 4/1966 | Roth | 251/129.21 |
| 3,982,562 | 9/1976 | Pickett | 251/129.2 X |
| 4,170,339 | 10/1979 | Ueda et al. | 251/129.2 |
| 4,587,795 | 5/1986 | Yamashita | 222/504 X |
| 5,098,062 | 3/1992 | Lungu | 251/65 |
| 5,156,372 | 10/1992 | Conrad | 251/65 |
| 5,301,848 | 4/1994 | Conrad et al. | 222/504 X |
| 5,524,794 | 6/1996 | Benedetti, Jr. et al. | 222/504 X |

*Primary Examiner*—Kevin P. Shaver
*Attorney, Agent, or Firm*—Henderson & Sturm

[57] ABSTRACT

An electromagnetic meter including an electrical coil with a ferromagnetic core. Electrical current flowing through the coil is controlled in a predetermined cycle by a switching mechanism. The meter housing has a material outlet and a bracket is pivotally attached to the housing. A gate is attached to the bracket and is movable between a closed position covering the material outlet and an open position spaced from the material outlet. A permanent magnet is also attached to the bracket and positioned at one end of the core offset from its longitudinal axis. When current flows through the coil the magnet is repelled away from the core, and when current flow is stopped the magnet is attracted to the core. Displacement of the magnet responsive to current flow moves the gate between the open and closed positions.

20 Claims, 2 Drawing Sheets

ELECTROMAGNETIC METER

BACKGROUND ART

Various electronic metering devices are known but most have limitations that restrict the application of the meter. These limitations include slow cycle times, high power usage, complicated controls and calibrations, difficulty in adapting to existing equipment, excessive wear of surfaces resulting in erratic flow rates, and complicated structures including springs and seals resulting in high production costs and maintenance expenses.

Those concerned with these and other problems recognize the need for an improved electromagnetic meter.

DISCLOSURE OF THE INVENTION

The present invention provides an electromagnetic meter including an electrical coil with a ferromagnetic core. Electrical current flowing through the coil is controlled in a predetermined cycle by a switching mechanism. The meter housing has a material outlet and a bracket is pivotally attached to the housing. A gate is attached to the bracket and is movable between a closed position covering the material outlet and an open position spaced from the material outlet. A permanent magnet is also attached to the bracket and positioned at one end of the core offset from its longitudinal axis. When current flows through the coil the magnet is repelled away from the core, and when current flow is stopped the magnet is attracted to the core. Displacement of the magnet responsive to current flow moves the gate between the open and closed positions.

An object of the present invention is the provision of an improved electromagnetic meter.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
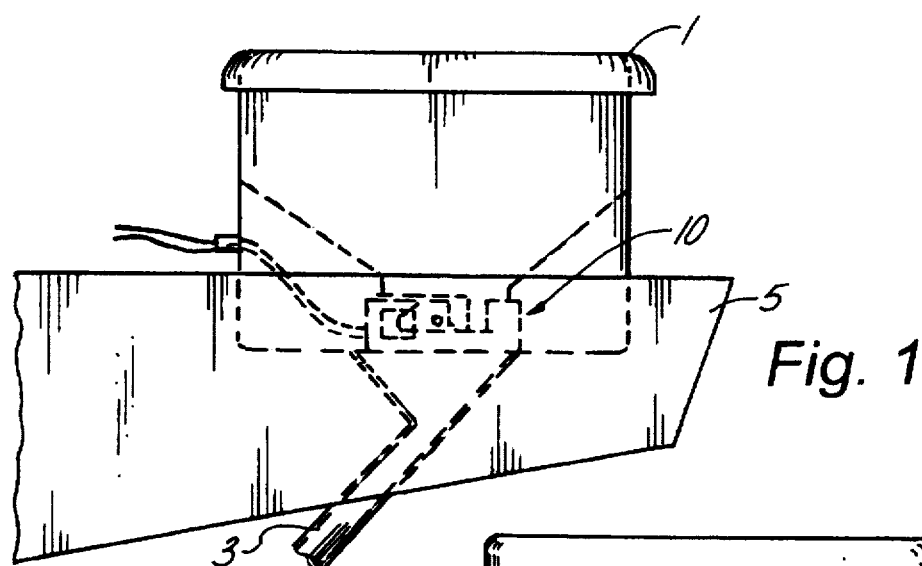
FIG. 1 is a partial side elevational view showing a granular chemical hopper mounted on the subframe of a planting unit where the electromagnetic meter of the present invention is attached between the hopper outlet and the ground directed material delivery tube.

Referring now to the drawings, wherein like reference numerals designate identical or corresponding parts throughout the several views, FIG. 1 shows the electromagnetic meter (10) of the present invention secured to the sloping bottom wall of a granular chemical hopper (1). The hopper (1) and a material delivery tube (3) are supported on the subframe (5) of a seed planting unit (not shown). Granular material such as insecticide or pesticide passes from the hopper (1), through the meter (10), and is delivered to the appropriate position with respect to the seeds in the seed furrow by the tube (3).

Figure 2:
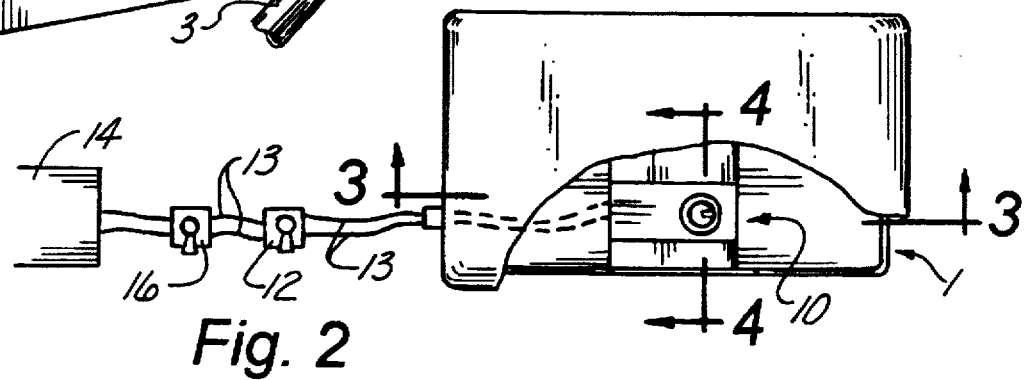
FIG. 2 is a top plan view of the hopper with a portion cutaway to show the position of the meter.

As schematically illustrated in FIG. 2, the flow of electrical current to the meter (10) is selectively provided by a switching mechanism (12) electrically connected by wires (13) to the meter (10). The switching mechanism (12) could include a pickup coil or magnetic switch mounted adjacent a rotating shaft or sprocket with iron or magnetic teeth, or any other structure that will appropriately time the cycling operation of the meter (10) to deliver a precise small quantity of material at the appropriate time. An operator control box (14) allows the operator to control and monitor the meter (10) from a remote location such as the tractor cab. An optional lift switch (16) may be used to lock the meter (10) in a closed position when the planter is lifted from the ground while turning around at the end of a row and while being transported from one field to another.

Figure 3:
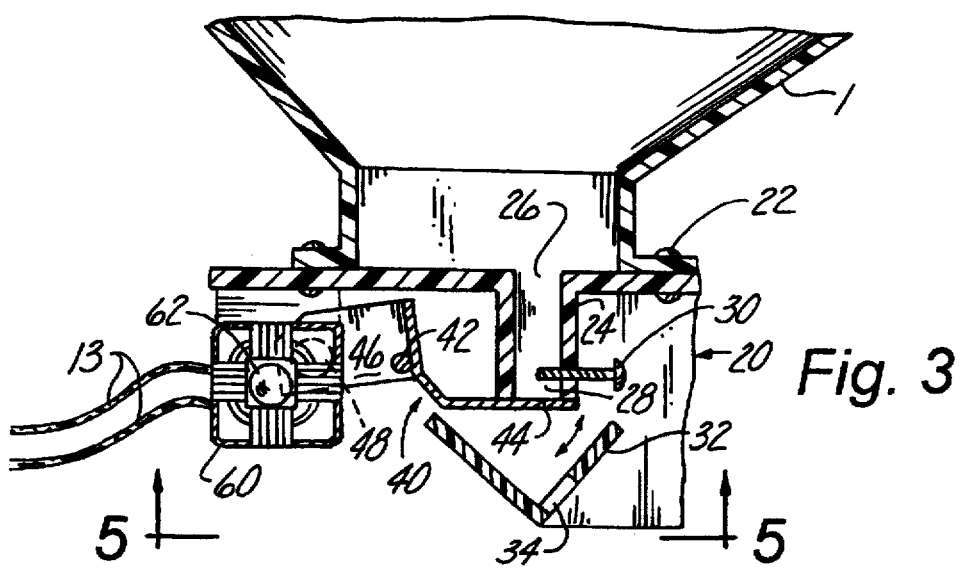
FIG. 3 is a sectional view taken along line 3—3 of FIG. 2 showing the meter in side elevation.
Figure 4:
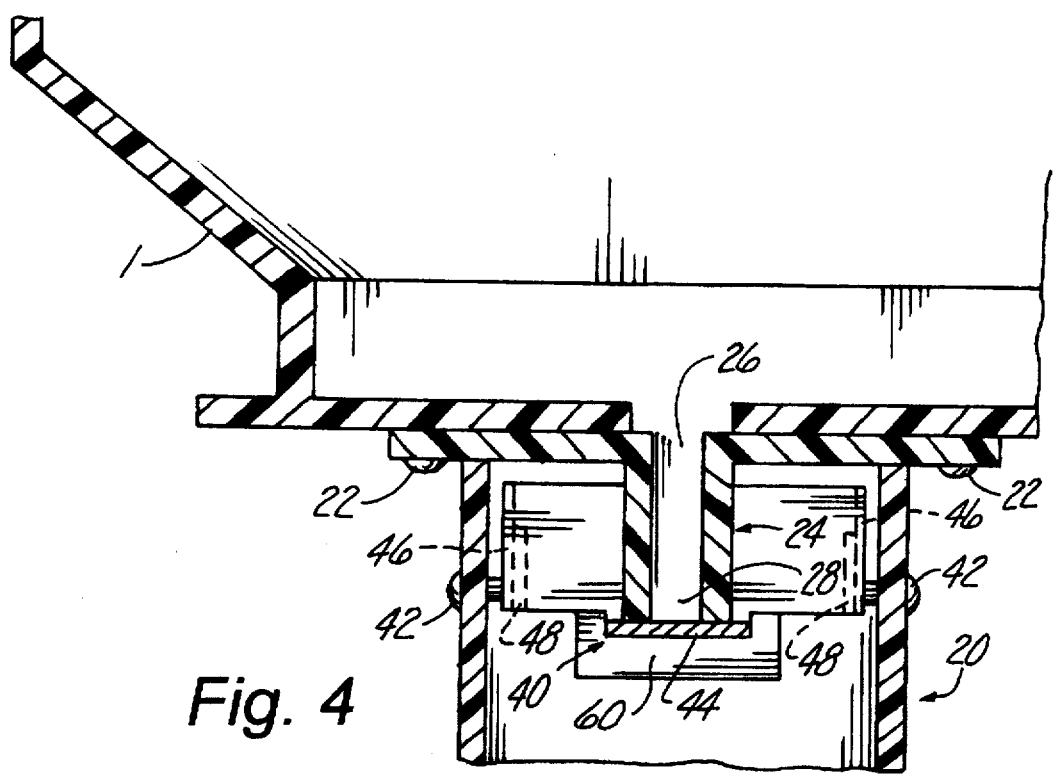
FIG. 4 is a sectional view taken along line 4—4 of FIG. 2 showing the meter in rear elevation.
Figure 5:
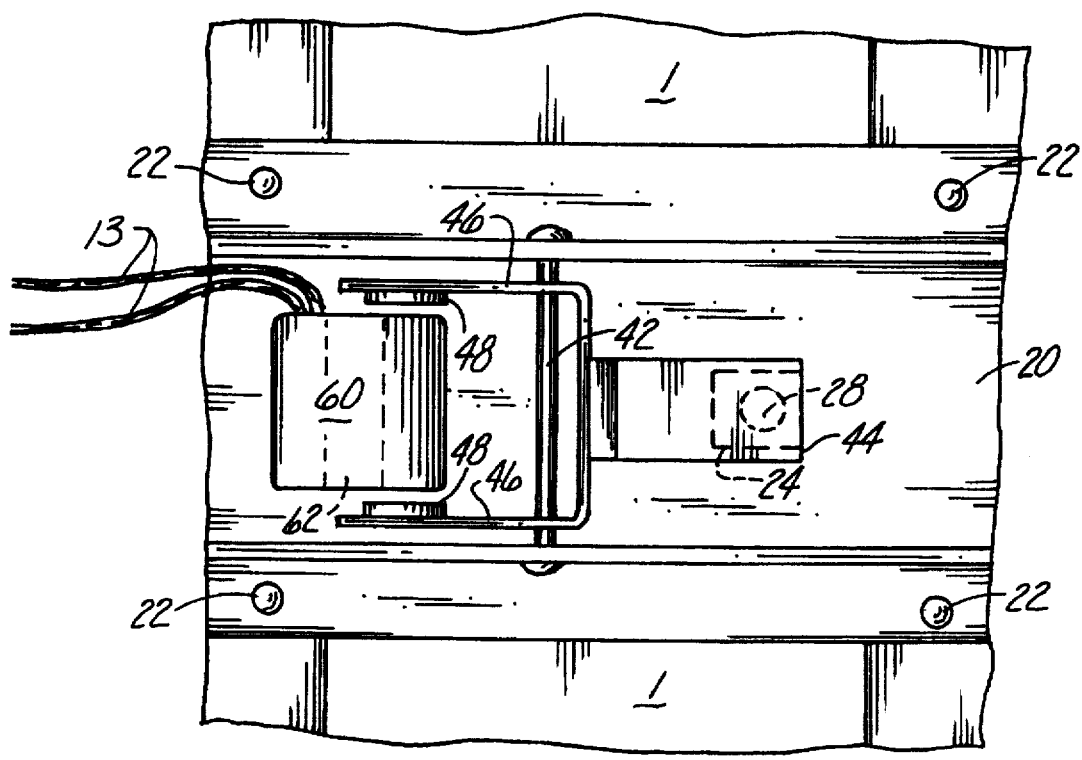
FIG. 5 is a sectional view taken along line 5—5 of FIG. 3 showing the meter in bottom plan.

The preferred embodiment of the meter (10) is best illustrated in FIGS. 3–5. The meter (10) includes a housing (20) attached by bolts (22) to the sloping bottom wall of the chemical hopper (1). The housing (20) includes a flow channel (24) having a material inlet (26) and a material outlet (28). The maximum flow rate of fluent material through the channel (24) is primarily regulated by the cross-sectional area of the channel (24) and is secondarily regulated by a flow adjustment calibration screw (30). A V-shaped trough (32) including an opening (34) is positioned directly below the channel (24).

A bracket (40) is pivotally attached by a pin (42) to the housing (20). One end of the bracket (40) carries a gate (44). The gate (44) is movable as shown by the directional arrow (FIG. 3) between a closed position covering the material outlet (28), and an open position spaced from the outlet (28). The other end of the bracket (40) forms a yoke having arms (46). The interior surface of each arm (46) carries a permanent magnet (48).

An electrical coil (60) is attached to the housing (20) and a ferromagnetic core (62) is disposed within the coil (60). When the switching mechanism (12) allows the flow of electrical current through the wires (13) to the coil (60), a magnetic field is produced which magnetizes the core (62). As best shown in FIGS. 3 and 5, the permanent magnets (48) are positioned at the ends of the core (62) offset to one side of the longitudinal axis of the core (62).

As shown in FIG. 3, the gate (44) and the magnet (48) are arranged at opposite ends of the bracket (40) with the magnet (48) disposed above the core (62). This structure provides for a positive, gravity closing of the gate (44) since the heavier end of the bracket (40) is opposite the gate (44). It is to be understood that other geometric arrangements will also be included within the scope of the invention.

In operation when current flows through the coil (60), the magnetic field induced in the core (62) is reversed. When the field reverses, the permanent magnets (48) carried by the arms (46) are repelled causing the bracket (40) to pivot about the pin (42) and causing the gate (44) to move away from the material outlet (28) to the open position. When the desired amount of material has discharged through the outlet (28), the switch (12) is positioned to stop the flow of current through the coil (60). The permanent magnets (48) are then attracted to the iron core (62) causing the gate (44) to move back to the closed position. Material passing through the material outlet (28) is deflected from a vertical drop by the gate (44) which is inclined when in the open position. The V-shaped trough (32) acts to redirect the material through the central opening (34) for discharge into the material delivery tube (3).

In typical application for use of the meter (10) a shaft or sprocket on a planting unit would be coupled with a sensor to activate the meter (10) to open at intervals of 18 or 24 inches as the planter travels over the field. The operator would have access to a control having an on-off switch and indicator lights to show the operational status. Also, the lift switch (16) would lock the meter (10) shut at times when the planter is raised out of the soil. To provide extra closing force to prevent leakage, relays may be used to magnetize the iron core (62) in the same direction as the field induced by the permanent magnets (48).

Obviously, many modifications and variations of the present invention are possible in light of the above teachings. It is therefore to be understood that, within the scope of the appended claims, the invention may be practiced otherwise than as specifically described.

I claim:

1. An electromagnetic meter, comprising:
   a housing having a material outlet;
   an electrical coil operably attached to the housing, the coil being disposed to produce a magnetic field when electrical current flows through the coil;
   a switch operably attached to the coil to selectively provide electrical current flow to the coil;
   a ferromagnetic core disposed within the electrical coil, the core having a longitudinal axis;
   a bracket pivotally attached to the housing;
   a gate attached to the bracket and being movable between a closed position covering the material outlet and an open position spaced from the material outlet; and
   a permanent magnet attached to the bracket and disposed at one end of the ferromagnetic core, the magnet being offset from the longitudinal axis of the core, wherein the magnet is repelled away from the core when electrical current is flowing through the coil and the magnet is attracted to the core when electrical current is not flowing through the coil, whereby displacement of the magnet results in movement of the gate between the opened and closed positions.

2. The meter of claim 1 wherein the bracket includes a yoke having a pair of spaced arms, and a permanent magnet is attached to each arm, the magnets being disposed at opposite ends of the core offset from the axis.

3. The meter of claim 1 wherein the bracket is pivotally attached to the housing by a horizontal pin, and wherein the magnet is disposed on one lateral side of the pin and the gate is disposed on the other lateral side of the pin.

4. The meter of claim 2 wherein the bracket is pivotally attached to the housing by a horizontal pin, and wherein the magnets are disposed on one lateral side of the pin and the gate is disposed on the other lateral side of the pin.

5. The meter of claim 3 wherein the magnet is disposed above the axis of the core.

6. The meter of claim 4 wherein the magnets are disposed above the axis of the core.

7. The meter of claim 1 wherein a material flow calibration adjustment is disposed in the housing above the gate.

8. The meter of claim 2 wherein a material flow calibration adjustment is disposed in the housing above the gate.

9. The meter of claim 3 wherein a material flow calibration adjustment is disposed in the housing above the gate.

10. The meter of claim 4 wherein a material flow calibration adjustment is disposed in the housing above the gate.

11. The meter of claim 5 wherein a material flow calibration adjustment is disposed in the housing above the gate.

12. The meter of claim 6 wherein a material flow calibration adjustment is disposed in the housing above the gate.

13. The meter of claim 1 wherein the core is iron.

14. An electromagnetic meter, comprising:
    a housing having a material outlet;
    an electromagnet operably attached to the housing, the electromagnet including a ferromagnetic core;
    a switch means operably attached to the electromagnet for selectively providing electrical current flow to the electromagnet;
    a bracket pivotally attached to the housing;
    a movable gate means attached to the bracket for selectively covering the material outlet; and
    a permanent magnet attached to the bracket and disposed adjacent the core offset from the axis thereof, wherein the magnet is repelled away from the core when current flows to the electromagnet and the magnet is attracted to the core when current is not flowing to the electromagnet, whereby displacement of the magnet results in movement of the gate means between an open position spaced from the material outlet and a closed position covering the material outlet.

15. The meter of claim 14 wherein the bracket includes a yoke having a pair of spaced arms, and a permanent magnet is attached to each arm, the magnets being disposed at opposite sides of the core offset from the axis.

16. The meter of claim 14 wherein the bracket is pivotally attached to the housing by a horizontal pin, and wherein the magnet is disposed on one lateral side of the pin and the gate is disposed on the other lateral side of the pin.

17. The meter of claim 15 wherein the bracket is pivotally attached to the housing by a horizontal pin, and wherein the magnets are disposed on one lateral side of the pin and the gate is disposed on the other lateral side of the pin.

18. The meter of claim 16 wherein the magnet is disposed above the axis of the core.

19. The meter of claim 17 wherein the magnets are disposed above the axis of the core.

20. The meter of claim 14 wherein a material flow calibration adjustment is disposed in the housing above the gate.

* * * * *